United States Patent
Arimilli et al.

(10) Patent No.: US 6,748,501 B2
(45) Date of Patent: Jun. 8, 2004

(54) MICROPROCESSOR RESERVATION MECHANISM FOR A HASHED ADDRESS SYSTEM

(75) Inventors: Ravi Kumar Arimilli, Austin, TX (US); Robert Alan Cargnoni, Austin, TX (US); Guy Lynn Guthrie, Austin, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 09/752,948

(22) Filed: Dec. 30, 2000

(65) Prior Publication Data

US 2002/0087815 A1 Jul. 4, 2002

(51) Int. Cl.[7] ............................................. G06F 12/00
(52) U.S. Cl. ....................................... 711/155; 711/145
(58) Field of Search ................................ 711/155, 126, 711/128, 133, 144, 145, 129, 153

(56) References Cited

U.S. PATENT DOCUMENTS

| 5,761,731 A | * | 6/1998 | Van Doren et al. | ......... 711/155 |
| 5,895,495 A | * | 4/1999 | Arimilli et al. | ............. 711/156 |
| 6,073,211 A | * | 6/2000 | Cheng et al. | ................ 711/122 |
| 6,141,734 A | * | 10/2000 | Razdan et al. | ............... 711/144 |

* cited by examiner

*Primary Examiner*—Matthew Kim
*Assistant Examiner*—Shane M Thomas
(74) *Attorney, Agent, or Firm*—Casimer K. Salys; Bracewell & Patterson, L.L.P.

(57) ABSTRACT

A method of storing values in a sliced cache by providing separate, but coordinated, reservation units for each cache slice. When a load-with-reserve (larx) operation is issued from the processor core as part of an atomic read-modify-write sequence, a message is broadcast to each of the cache slices to clear reservation flags in the slices; a reservation flag is also set in the target cache slice, and a memory address associated with the load-with-reserve operation is loaded into a reservation unit of the target cache slice. When a conditional store operation is issued from the core to complete the atomic read-modify-write sequence, a second message is broadcast to any non-target cache slice of the processing unit to clear reservation flags in the non-target cache slice(s). The conditional store operation passes if the reservation flag of the target cache slice is still set, and the memory address associated with the conditional store operation matches the memory address loaded in a reservation unit of the target cache slice. The broadcast messages coordinate the reservation units and facilitate the use of larger sliced caches.

17 Claims, 3 Drawing Sheets

MICROPROCESSOR RESERVATION MECHANISM FOR A HASHED ADDRESS SYSTEM

BACKGROUND OF THE INVENTION

1. Field of the Invention

The present invention generally relates to computer systems, specifically to computer systems having caches in the memory hierarchy, and more particularly to a method of reserving a cache block, in a sliced or hashed cache, for an atomic read-modify-write sequence.

2. Description of the Related Art

The basic structure of a conventional multiprocessor computer system 10 is shown in FIG. 1. Computer system 10 has several processing units, two of which, 12a and 12b, are depicted, which are connected to various peripheral devices, including input/output (I/O) devices 14 (such as a display monitor, keyboard, and permanent storage device), memory device 16 (such as random-access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20. Computer system 10 may have many additional components which are not shown, such as serial and parallel ports for connection to modems or printers. Those skilled in the art will further appreciate that there are other components that might be used in conjunction with those shown in the block diagram of FIG. 1; for example, a display adapter might be used to control a video-display monitor, a memory controller can be used to access memory 16, etc. The computer can also have more than two processing units.

In a symmetric multiprocessor (SMP) computer, all of the processing units are generally identical; that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corporation. The processing unit can also have one or more caches, such as an instruction cache 24 and a data cache 26, which are implemented using high-speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit 12a can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 512 kilobytes, while the processor may be an IBM PowerPC™ processor having on-board caches with 128 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels of serially connected caches.

A cache has many "blocks" which individually store the various instructions and data values. The blocks in any cache are divided into groups of blocks called "sets." A set is the collection of blocks that a given memory block can reside in. For any given memory block, there is a unique set in the cache that the block can be mapped into, according to preset mapping functions. The number of blocks in a set is referred to as the associativity of the cache (e.g. 2-way set associative means that, for any given memory block, there are two blocks in the cache that the memory block can be mapped into). However, several different blocks in main memory can be mapped to any given set.

When all of the blocks in a set for a given cache are full and that cache receives a request, whether a "read" or "write," to a memory location that maps into the full set, the cache must "evict" one of the blocks currently in the set. The cache chooses a block by one of a number of means known to those skilled in the art (least recently used (LRU), random, pseudo-LRU, etc.) to be evicted. If the data in the chosen block is modified, that data is written to the next lowest level in the memory hierarchy which may be another cache (in the case of the L1 or on-board cache) or main memory (in the case of an L2 cache, as depicted in the two-level architecture of FIG. 1). However, if the data in the chosen block is not modified, the block is simply abandoned and not written to the next lowest level in the hierarchy. This process of removing a block from one level of the hierarchy is known as an "eviction." At the end of this process, the cache no longer holds a copy of the evicted block.

Another aspect of symmetric multiprocessors which is relevant to the invention relates to the necessity of providing a means of synchronizing the actions of the various processors in a system to allow cooperation among processors working on a task. To achieve this, most modern processors include in their instruction sets explicit instructions to handle synchronization. In particular, the PowerPC™ instruction set provides two instructions known as "larx" and "stcx." These instructions come in two forms: "lwarx" and "stwcx" for 32-bit implementations and "ldarx" and "stdcx" for 64-bit implementations. Henceforth, the terms "larx" and "stcx" are used to denote instructions for either implementation (the ldarx and stdcx instructions have essentially the same semantics, with the exception that ldarx and stdcx operate on 8-byte quantities and lwarx and stwcx operate on 4-byte quantities). These instructions serve to build synchronization primitives.

The larx instruction loads an aligned 4-byte word of memory into a register in the processor. In addition, larx places a "reservation" on the block of memory that contains the word of memory accessed. A reservation contains the address of the block and a flag. This flag is made active, and the address of the block is loaded when a larx instruction successfully reads the word of memory referenced. If a reservation is valid (the flag is active) the processor and the memory hierarchy are obligated to cooperatively monitor the entire system for any operation that may write to the block for which the reservation exists. If such a write occurs, the flag in the reservation is reset. The reservation flag is used to control the behavior of the stcx instruction.

The stcx instruction is the counterpart to larx. The stcx instruction first determines if the reservation flag is valid. If so, the stcx instruction performs a store to the 4-byte word of memory specified, sets a condition code register to indicate that the store succeeded, and resets the reservation flag. If, on the other hand, the reservation flag in the reservation is not valid, the stcx instruction does not perform a store to memory and sets a condition code register indicating that the store failed. The stcx instruction is often referred to as a "conditional store" due to the fact that the store is conditional on the status of the reservation flag.

The general concept underlying the larx/stcx instruction sequence is to allow a processor to read a memory location, modify the location in some way, and to store the new value to memory while ensuring that no other processor has altered the memory location from the point in time when the larx was executed until the stcx completes. Such a sequence is usually referred to as an "atomic read-modify-write" sequence because the processor was able to read the location, modify it, and then write the new value without interruption by another processor writing to the location. The larx/stcx sequence of operations does not occur as one uninterruptable sequence, but rather, the fact that the processor is able to execute a larx and then later successfully complete the stcx ensures the programmer that the read/modify/write sequence did, in fact, occur as if it were atomic. This atomic property of a larx/stcx sequence can be used to implement a number of synchronization primitives well-known to those skilled in the art.

FIG. 1 depicts two reservation units 32 and 34 which are associated, respectively, with caches 26 and 30. These units contain the reservation, both the address and the flag, and they each "snoop" (monitor) their respective buses 36 and 38 for any write operation within the reservation granule address, and invalidate the associated reservation flag when such an operation is detected (if a reservation-killing operation is detected by a lower-level cache, it is sent up to the higher-level caches). As such, they monitor the buses and respond to bus transactions in a manner similar to the caches themselves. The reservation unit addresses and flags are usually set in one of two general ways. If a processor attempts to issue a larx to a memory location whose block is not present in any cache of its memory hierarchy, a read operation is propagated from the processor at the top of the hierarchy through each of the caches in the hierarchy and finally out on the generalized interconnect 20 to be serviced. These read operations are tagged with a special indicator to inform the reservation units in the caches that the read is for a larx and that the reservation units should set the address and flag.

Alternatively, a processor can issue a larx to a memory location in a block already present in the L1 cache 26. This situation is known as an "larx hit." In this case, the processor's reservation unit 32 will set its reservation address and flag and will issue a special bus operation known as a larx reserve (hereafter RESERVE) on the connection 36 between the L1 and L2 caches. The L2 cache will receive the RESERVE message, which includes the address of the reservation, and will set its reservation address and flag in its reservation unit 34. If other cache levels are present (not shown in FIG. 1), the L2 cache will forward the RESERVE message on to any lower caches in the memory hierarchy, which will repeat the actions taken by the L2 cache, at which point, all the reservation units will be properly set. The process of propagating the RESERVE messages down through all cache levels can take an arbitrary amount of time, in general, depending on availability of the inter-cache connections (e.g., 36 and 38) and the specific details of the particular implementation.

There is one other way that the reservation units can be set. This situation occurs when a block has been partially, but not completely, evicted from a cache hierarchy. For example, assume that the processor core 22 executes a larx instruction to an address that is in a block not present in the L1 cache, but is present in the L2 cache.

In this case, processor core 22 will issue a read that is marked as a read for a larx to the L2 cache. The L2 cache will determine that it has a copy of the block and return this block to the processor core directly. Once the block is returned to the processor core, the processor core updates its reservation address and flag in reservation unit 32. The L2 cache will also set its reservation and send a RESERVE bus operation to any lower level caches to inform them of the reservation. This scenario is merely a combination of the two cases described earlier. In general, a read from the processor core with the larx indication propagates down the hierarchy, setting reservation units until it encounters a cache (potentially the L1) that has a copy of the block which satisfies the read. That cache then propagates a RESERVE bus operation down the remainder of the hierarchy to set the remaining reservation units. In this manner, all of the reservation units in the hierarchy are loaded as a result of a larx instruction with the proper reservation information and can begin snooping for transactions that write to the reservation granule. This allows the reservation units to reset the reservation flags and prevent a stcx instruction from completing when the memory location for the reservation could, potentially, have been modified.

As multiprocessor computer systems become larger and more complex, designers are finding it increasingly difficult to implement many of the foregoing cache coherency mechanisms. For example, very large caches can provide more efficient operation, but it is difficult to implement the larx/stcx reservation protocol because of the sheer physical size of the caches. The chip layout prevents efficient placement of a single reservation unit for the cache. It would, therefore, be desirable to devise a more efficient method of implementing larx/stcx semantics in large caches. It would be particularly advantageous if the method were feasible for higher processor clock frequencies.

SUMMARY OF THE INVENTION

It is therefore one object of the present invention to provide an improved method of executing an atomic read-modify-write sequence in a computer system.

It is another object of the present invention to provide such a method that more efficiently handles cache-entry reservations in a multiprocessor computer system.

It is yet another object of the present invention to provide a method executing an atomic read-modify-write sequences using load-and-reserve (larx) and conditional store (stcx) instructions in very large caches.

The foregoing objects are achieved in a method of storing values in a cache for a processing unit of a computer system, wherein the cache is divided into a plurality of slices which receive particular cache lines based on a preset mapping function, generally comprising the steps of issuing a load-with-reserve (larx) operation from the processor core as part of an atomic read-modify-write sequence, then broadcasting a message to each of the cache slices of the processing unit to clear reservation flags in the slices, and setting a reservation flag in the target cache slice. A memory address associated with the load-with-reserve operation is loaded into a reservation unit of the target cache slice. If the message arrives at the target cache slice concurrently with the load-and-reserve operation, the message is overridden to allow completion of the setting of the reservation flag. When a conditional store operation is issued from the core to complete the atomic read-modify-write sequence, a second message is broadcast to any non-target cache slice of the processing unit to clear reservation flags in the non-target cache slice(s). The conditional store operation passes if the reservation flag of the target cache slice is still set, and the memory address associated with the conditional store operation matches the memory address loaded in a reservation unit of the target cache slice.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENTS

Figure 1:
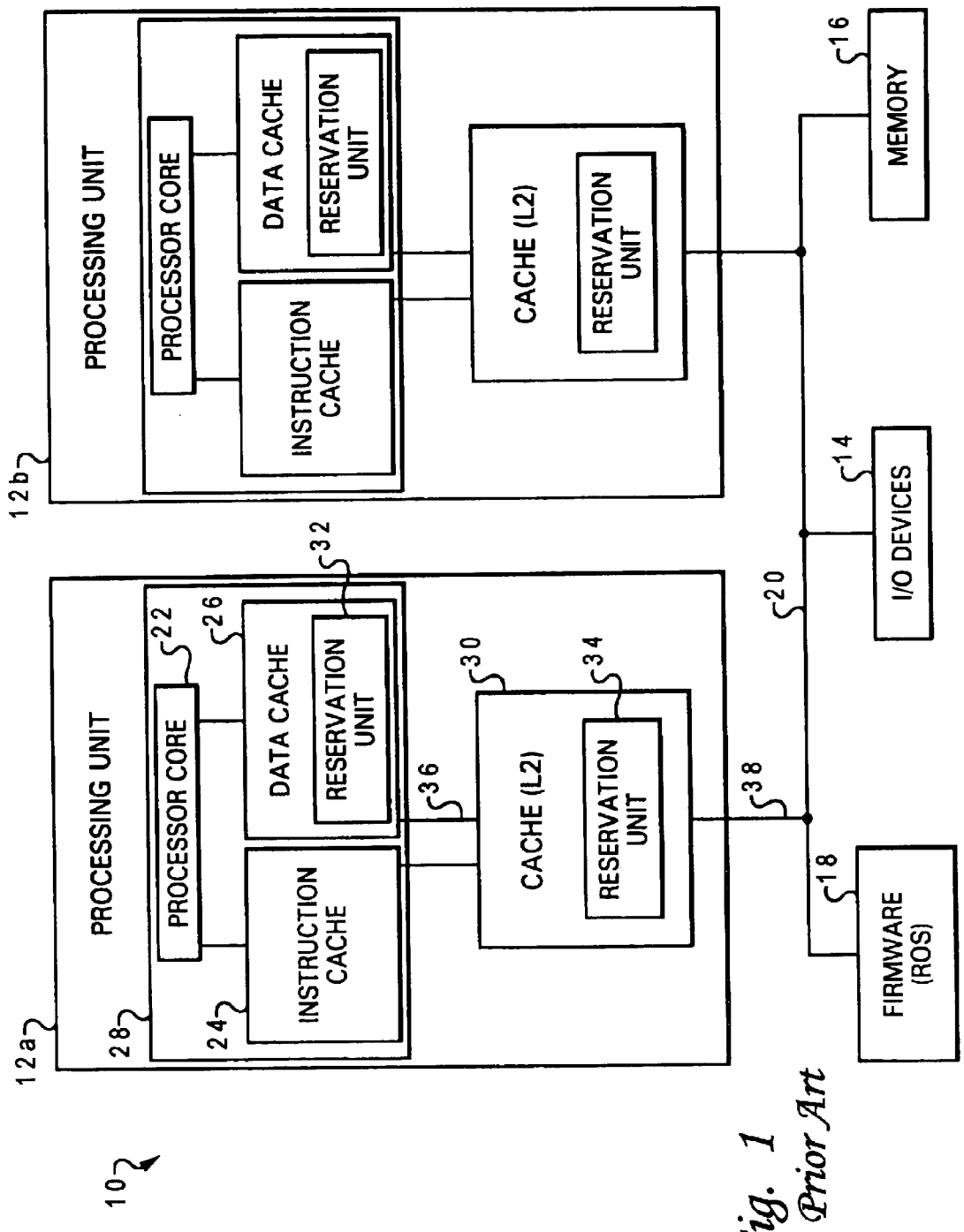
FIG. 1 is a block diagram of a prior-art multiprocessor computer system illustrating caches having reservation units for use with atomic read-modify-write sequences.
Figure 2:
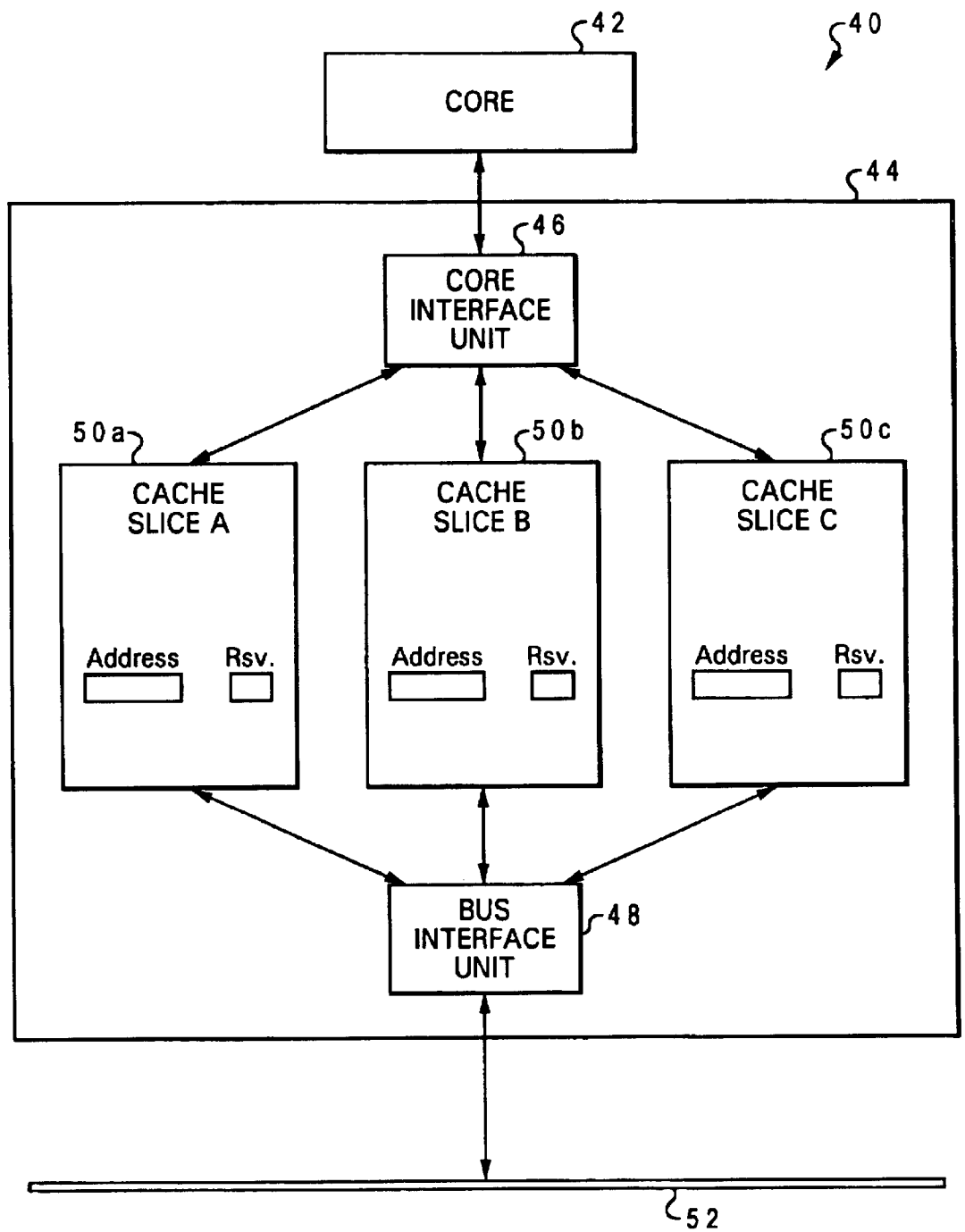
FIG. 2 is a block diagram of a processing unit constructed in accordance with the present invention, having a cache which is divided into slices, with separate but coordinated reservation units for each cache slice.

With reference now to the figures, and in particular with reference to FIG. 2, there is depicted one embodiment 40 of a processing unit of a multiprocessor computer system constructed in accordance with the present invention. While the present invention is directed to a method of handling cache operations in a memory-coherent, multiprocessor system such as the system of FIG. 2, the present invention could be applied to computer systems that have additional hardware components not shown in FIG. 2, or having a different interconnection architecture (or both), so those skilled in the art will appreciate that the present invention is not limited to the generalized system shown in that figure.

Processing unit 40 is primarily comprised of a processor core 42 and a cache 44. In the illustrative embodiment, core 42 includes a first level (L1) cache (not separately shown), and cache 44 is a lower level (L2) cache. Core 42 may have other conventional elements, such as a load/store unit (LSU, also not separately shown) that communicates with L2 cache 44.

Cache 44 includes a core interface unit 46, a bus interface unit 48, and three cache slices 50a, 50b, and 50c. These three cache slices together constitute the entire array of cache entries (program instructions or operand data) contained within cache 44. Cache lines are assigned to a specific one of the three cache slices according to a preset mapping function, based on address hashing. Each of the cache slices communicates with core interface unit 46 and bus interface unit 48. The size of the cache slices may vary; an exemplary size is 512 kilobytes per cache slice. More or less than three slices may be provided in cache 44.

Core interface unit 46 handles requests from core 42 (i.e., the load/store unit), such as load operations or store operations. Bus interface unit 48 provides communications between cache 44 and the rest of the memory hierarchy via a generalized interconnect 52, including conventional snooping functionality for cache coherency.

Each of the cache slices 50a, 50b, and 50c has a separate reservation unit, that is, a reservation flag and an address field for the reservation. While three separate reservation units are provided, they are coordinated so as to act as a single reservation unit from the perspective of core 42. The present invention utilizes two new operations to handle reservations for multiple cache slices. These operations are referred to herein as larx broadcast, and stcx broadcast. The control logic for issuing these messages may be located within core interface unit 46.

When core 42 issues a load-with-reserve (larx) operation as part of an atomic read-modify-write sequence, that operation propagates down to the appropriate (target) cache slice based on the hash function as applied to the address for the larx operation. Core interface unit 46 also receives the larx request, and issues a larx broadcast to all of the cache slices 50a, 50b, and 50c. The larx broadcast clears the reservation flags in all of the cache slices, to ensure that the sequence begins with a clean slate.

The larx broadcast is sent prior to (or, at the latest, coincident with) the larx operation itself. If the larx broadcast arrives at the target cache slice coincident with the actual larx operation, control logic at the reservation unit overrides the larx broadcast, and allows the reservation flag to be set (turned on), and the new reserved address loaded in the reservation unit. Similar to the prior art, the reservation flag in the target cache slice can be reset (turned off) in response to a stcx command (as explained further below), or in response to the snooping of an operation from an adjacent processing unit that stores to the coherency granule of the reserved address. The reservation flag will also be reset if another larx operation, directed to a different cache slice, results in the issuance of another larx broadcast. Once a particular larx operation is in flight, no new larx or stcx commands will issue until the old one has completed. In this manner, the invention ensures that the dependency of larx and stcx operations upon the single available (per core) reservation tracking mechanism is respected.

When core 42 issues a conditional store (stcx) operation to complete an atomic read-modify-write sequence, that operation also propagates down to the target cache slice based on the hash function as applied to the address for the stcx operation. When core interface unit 46 receives the stcx request, it issues a stcx broadcast to the non-target cache slices. For example, if the stcx command has an address which hashes to cache slice 50a, then the stcx broadcast would be sent only to cache slices 50b and 50c, clearing any potentially set reservation flags in those non-target cache slices (the only time a stcx broadcast hits a set reservation flag is when the address of the stcx command does not match the address of the preceding larx command). The stcx broadcast is not sent to the target slice. It is important to clean up any set reservation flags in this manner in order to keep one of the non-targeted slices from later passing a different stcx operation.

Although dependencies must still be respected, the relative timing of the stcx broadcast is otherwise unimportant. In other words, the stcx broadcast can arrive at the non-target slices after the basic stcx operation has hit the target slice.

The stcx operation leaves the target slice with a reset reservation flag, regardless of whether the stcx succeeds or fails. If the reservation flag was previously turned off, then the stcx operation will fail, and the reservation flag will remained turned off. If the reservation flag is currently turned on, but the addresses do not match, then the stcx operation again fails, and the reservation flag is reset. Finally, if the reservation flag is currently turned on and the addresses match, the stcx passes, but the reservation flag is still reset. Once a particular stcx operation is in flight, no new larx or stcx commands will issue until the old one has completed.

Figure 3:
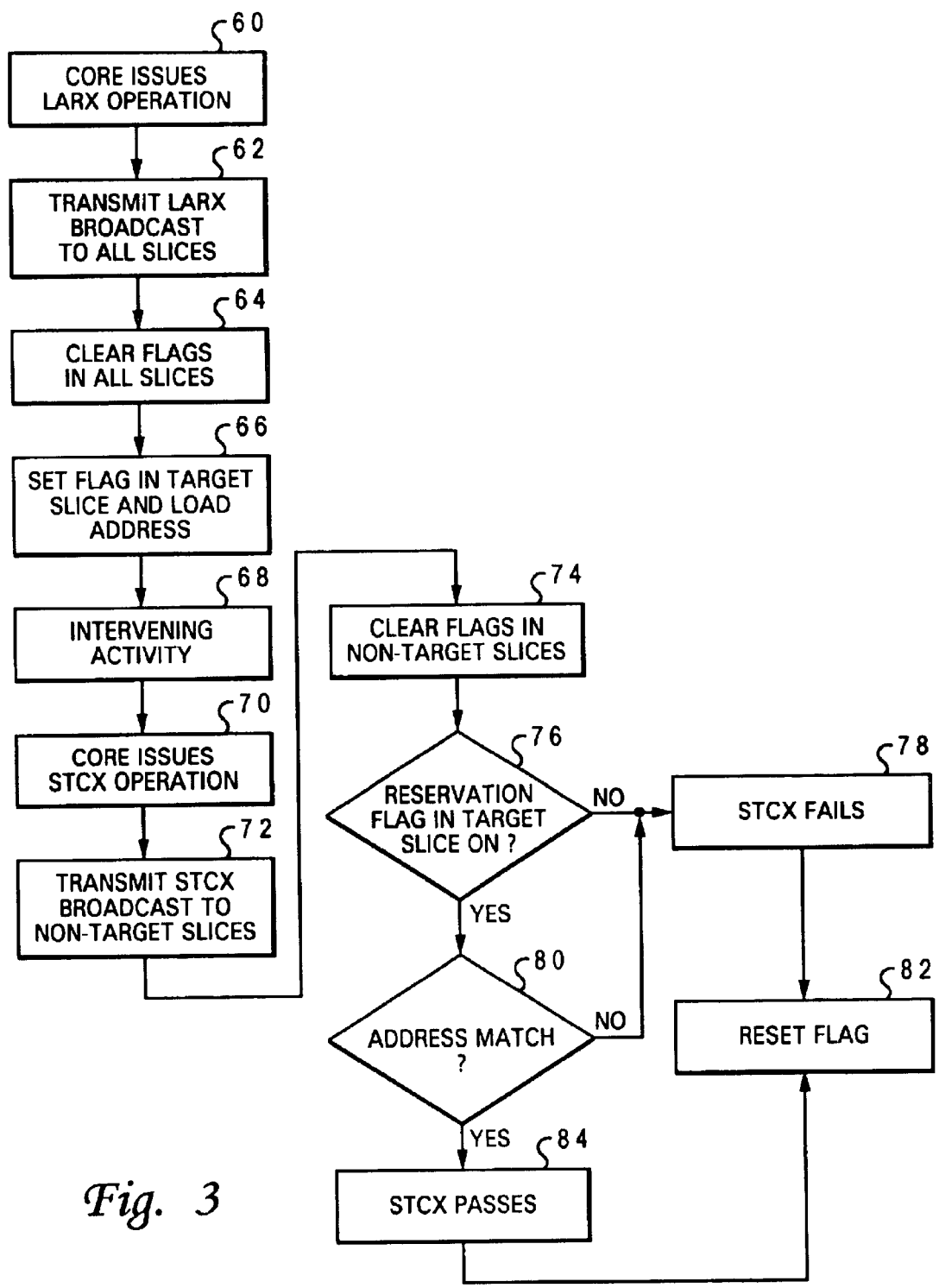
FIG. 3 is a chart depicting the logical flow for execution of load-with-reserve and conditional store operations according to an exemplary implementation of the present invention.

The present invention can be further explained with reference to the flowchart of FIG. 3. In this example, the process begins with the core issuing a larx operation (60). In response to this operation, the core interface unit transmits the larx broadcast to all cache slices (62), and all reservation flags are cleared (64). The reservation flag in the target slice is turned on, and the larx address loaded in the reservation unit (66). After some possible intervening activity (68), the core issues a stcx operation (70). In response to this operation, the core interface unit transmits the stcx broadcast to all non-target cache slices (72), and the reservation flags in those slice are cleared (74). When the stcx operation arrives at the target slice, the reservation flag is examined (76). If the reservation flag has been reset, then the stcx operation fails (78), and this result is returned to the core. If the reservation flag is currently set, the address of the stcx command is compared to the address in the reservation unit (80). If the addresses do not match, the reservation flag is reset (82), and the operation again fails. If, however, the addresses match, then the stcx command passes (84).

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of storing values in a cache for a processing unit of a computer system, the method comprising:

issuing a load-with-reserve operation from a core of the processing unit to a cache as part of an atomic read-modify-write sequence, wherein the cache includes a data storage array divided into a plurality of slices at a same cache hierarchy level, wherein cache lines stored in said cache are distributed among said plurality of slices based on a preset address mapping function, and wherein each of said plurality of slices has a respective one of a plurality of reservation flags associated therewith;

in response to said issuing step, broadcasting a message to each of the plurality of cache slices to clear the reservation flag of each of the plurality of slices to remove any prior reservation; and setting the reservation flag of only the cache slice to which a load target address of the load-with-reserve operation is mapped by said preset address mapping function to indicate a reservation for the load target address.

2. The method of claim 1 further comprising loading the load target address of the load-with-reserve operation into a reservation register of the cache slice to which the load target address maps.

3. The method of claim 1, wherein the message arrives at the cache slices to which the load target address maps concurrently with the load-with-reserve operation, said method further comprising overriding the message to allow said setting of said reservation flag.

4. The method of claim 1 further comprising:

thereafter, issuing a conditional store operation from the core of the processing unit to complete the atomic read-modify-write sequence; and in response to said conditional store operation, broadcasting a second message to clear the reservation flag of any cache slice to which a store target address of said conditional store operation does not map.

5. The method of claim 4 further comprising determining, in response to said conditional store operation, that the reservation flag of a target cache slice to which said store target address maps is still set.

6. The method of claim 5 further comprising comparing said store target address of the conditional store operation to a reserved address loaded in a reservation register of the target cache slice.

7. The method of claim 6 further comprising performing the conditional store operation only in response to said store target address and said reserved addresses matching.

8. A computer system comprising:

a processor core program instructions;

a memory device that stores at least one of program instructions and data values;

an interconnect interconnecting said processor core and said memory device;

a cache connected to said processor core, said cache having a data array divided into a plurality of slices at a same cache hierarchy level, wherein cache lines stored in said cache are distributed among said plurality of slices based on a preset address mapping function, and wherein each of said plurality of slices has a respective one of a plurality of reservation flags associated therewith; and reservation means for responding to a load-with-reserve operation issued from said processor core as part of an atomic read-modify-write sequence, by broadcasting a message to each of said plurality of cache slices to clear the reservation flag of each of said plurality of cache slices to remove any prior reservation, and by setting a reservation flag of only the cache slice to which a load target address of the load-with-reserve operation is mapped by the present mapping function to indicate a reservation for the load target address.

9. The computer system of claim 8, wherein each of said plurality of cache slices has a reservation register associated therewith, and wherein said reservation means further loads the load target address of the load-with-reserve operation into the reservation register of said cache slice to which said load target address maps.

10. The computer system of claim 8 wherein:

the message arrives at the cache slice to which said load target address maps concurrently with the load-with-reserve operation; and said reservation means further overrides the message to allow the setting of the reservation flag.

11. The computer system of claim 8 wherein said reservation means further responds to a conditional store operation issued from said processor core to complete the atomic read-modify-write sequence, by broadcasting a second message to clear the reservation flag in each cache slice to which a store target address specified by the conditional store operation does not map.

12. The computer system of claim 11 wherein said reservation means further determines that said reservation flag of a target cache slice to which said store target address maps is still set, in response to the conditional store operation.

13. The computer system of claim 12 wherein said reservation means further compares said store target address of the conditional store operation to a reserved address loaded in a reservation register of said target cache slice.

14. The computer system of claim 13 wherein said reservation means further performs the conditional store operation only if the store target address and the reserved address match.

15. A cache, comprising:
   a data array divided into a plurality of slices at a same cache hierarchy level, wherein cache lines stored in said cache are distributed among said plurality of slices based on a preset address mapping function;
   a plurality of reservation flags each associated with a respective one of said plurality of cache slices; and
   a core interface unit that, responsive to receipt of a load-with-reserve operation issued from said processor core as part of an atomic read-modify-write sequence, broadcasts a message to each of said plurality of cache slices to clear the reservation flag of each of said plurality of cache slices to remove any prior reservation, and sets a reservation flag of the cache slice to which a load target address of the load-with-serve operation is mapped by the present mapping function to indicate a reservation for the load target address.

16. A processing unit, comprising:
   a cache in accordance with claim 15; and
   a processor core that executes program instructions.

17. A data processing system, comprising:
   a processing unit in accordance with claim 16;
   a memory device that stores at least one of program instructions and data values; and
   an interconnect interconnecting said processing unit and said memory device.

* * * * *